United States Patent
Mishina et al.

(10) Patent No.: US 12,401,494 B2
(45) Date of Patent: Aug. 26, 2025

(54) MACHINE LEARNING USING SECURE GRADIENT DESCENT COMPUTATION

(71) Applicant: NIPPON TELEGRAPH AND TELEPHONE CORPORATION, Tokyo (JP)

(72) Inventors: Ibuki Mishina, Musashino (JP); Dai Ikarashi, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 264 days.

(21) Appl. No.: 17/634,237

(22) PCT Filed: Aug. 14, 2019

(86) PCT No.: PCT/JP2019/031941
§ 371 (c)(1),
(2) Date: Feb. 9, 2022

(87) PCT Pub. No.: WO2021/029034
PCT Pub. Date: Feb. 18, 2021

(65) Prior Publication Data
US 2022/0329408 A1 Oct. 13, 2022

(51) Int. Cl.
*H04L 9/06* (2006.01)
*G06N 3/084* (2023.01)

(52) U.S. Cl.
CPC ............ *H04L 9/06* (2013.01); *G06N 3/084* (2013.01); *H04L 2209/046* (2013.01)

(58) Field of Classification Search
CPC .............. H04L 9/06; H04L 2209/046; H04L 2209/46; H04L 9/085; G06N 3/084
See application file for complete search history.

(56) References Cited

U.S. PATENT DOCUMENTS

| | | | |
|---|---|---|---|
| 11,816,575 B2* | 11/2023 | Gu | G06F 21/606 |
| 2018/0137405 A1* | 5/2018 | Moon | G06N 3/047 |
| 2024/0281208 A1* | 8/2024 | Hamada | G06F 7/544 |

FOREIGN PATENT DOCUMENTS

WO 2018/174873 A1 9/2018

OTHER PUBLICATIONS

Kingma, et al. "ADAM: a Method for Stochastic Optimization", Optimization, ICLR 2015, Jul. 23, 2015 (Jul. 23, 2015), XP055425253, Retrieved from the Internet: URL:https://arxiv.org/pdf/1412.6980v8.pdf [retrieved on Nov. 15, 2017].

(Continued)

*Primary Examiner* — Nicholas R Taylor
*Assistant Examiner* — Tania M Pena-Santana
(74) *Attorney, Agent, or Firm* — XSENSUS LLP (57) ABSTRACT

A calculation of a gradient descent method in secure computing is performed at high speed while maintaining accuracy. A secure gradient descent computation method calculates a gradient descent method while keeping a gradient and a parameter concealed. An initialization unit initializes concealed values [M], [V] of matrices M, V (S11). A gradient calculation unit determines concealed value [G] of a matrix G of a gradient g (S12). A parameter update unit calculates $[M] \leftarrow \beta 1 [M] + (1-\beta 1) [G]$ (S13-1), calculates $[V] \leftarrow \beta 2 [V] + (1-\beta 2) [G] \odot [G]$ (S13-2), calculates $[M\hat{\;}] \leftarrow \beta\hat{\;}1, t [M]$ (S13-3), calculates $[V\hat{\;}] \leftarrow \beta\hat{\;}2, t [V]$ (S13-4), calculates $[G\hat{\;}] \leftarrow$ Adam $([V\hat{\;}])$ (S13-5), calculates $[G\hat{\;}] \leftarrow [G\hat{\;}] \odot [M\hat{\;}]$ (S13-6), and calculates $[W] \leftarrow [W] - [G\hat{\;}]$ (S13-7).

3 Claims, 7 Drawing Sheets

(56) References Cited

OTHER PUBLICATIONS

Agrawal, et al., "QUOTIENT: Two-Party Secure Neural Network Training and Prediction", arxiv.org, Cornell University Library, 201 Olin Library Cornell University Ithaca, NY 14853, Jul. 8, 2019 (Jul. 8, 2019), XP081439054.

Chase, et al., "Private Collaborative Neural Network Learning", IACR, International Association for Cryptologic Research vol. 20170808:183434 Aug. 7, 2017 (Aug. 7, 2017), pp. 1-17, XP061034593, Retrieved from the Internet: URL:http://eprint.iacr.org/2017/762.pdf [retrieved on Aug. 7, 2017].

Mohassel et al., "SecureML: A System for Scalable Privacy-Preserving Machine Learning", IEEE Symposium on Security and Privacy, 2017, pp. 19-38.

Wagh et al., "SecureNN: 3-Party Secure Computation for Neural Network Training", Proceedings on Privacy Enhancing Technologies, 2019, vol. 1, 24 pages.

Hamada et al., "A Batch Mapping Algorithm for Secure Function Evaluation", Proceedings of IEICE, Institute of Electronics, Information and Communication Engineers, JP, vol. J96-A, No. 4, Apr. 1, 2013, pp. 157-165, XP008184067, ISSN: 0913-5707, with computer-generated English translation.

\* cited by examiner

MACHINE LEARNING USING SECURE GRADIENT DESCENT COMPUTATION

CROSS-REFERENCE TO RELATED APPLICATION

The present application is based on PCT filing PCT/JP2019/031941, filed Aug. 14, 2019, the entire contents of which are incorporated herein by reference.

TECHNICAL FIELD

The present invention relates to a technique for calculating in a gradient descent method in secure computing.

BACKGROUND ART

The gradient descent method is a learning algorithm that is often used in machine learning, such as deep learning and logistic regression. Conventional techniques for performing machine learning using a gradient descent method in secure computing include SecureML (NPL 1) and SecureNN (NPL 2).

While the most basic gradient descent method is relatively easy to implement, problems such as tend to fall into a local solution, slow to converge, and the like, are known. In order to solve these problems, various optimization techniques to gradient descent methods have been proposed, and in particular, a technique called Adam is known to have a fast convergence.

CITATION LIST

Non Patent Literature

NPL 1: Payman Mohassel and Yupeng Zhang, "SecureML: A System for Scalable Privacy-Preserving Machine Learning, "In IEEE Symposium on Security and Privacy, S P 2017, pp. 19-38, 2017.

NPL 2: Sameer Wagh, Divya Gupta, and Nishanth Chandran, "SecureNN: 3-Party Secure Computation for Neural Network Training, "Proceedings on Privacy Enhancing Technologies, Vol. 1, p. 24, 2019.

SUMMARY OF THE INVENTION

Technical Problem

However, processing of Adam includes a calculation of a square root and division, so processing costs in secure computing are very large. Meanwhile, in conventional techniques implemented by simple gradient descent methods, there is a problem in that overall processing time is long because the number of learning times required until convergence is large.

In consideration of technical problems like those described above, an object of the present invention is to provide a technique that can perform calculation of a gradient descent method in secure computing at high speed while maintaining accuracy.

Means for Solving the Problem

In order to solve the above problem, a secure gradient descent computation method of a first aspect of the present invention is a secure gradient descent computation method performed by a secure gradient descent computation system including a plurality of secure computation apparatuses, the secure gradient descent computation method calculating a gradient descent method while at least a gradient G and a parameter W are kept concealed, wherein $\beta_1$, $\beta_2$, $\eta$, and $\varepsilon$ are predetermined hyperparameters, $\bigcirc$ is a product for each element, t is the number of learning times, [G] is a concealed value of the gradient G, [W] is a concealed value of the parameter W, [M], [M^], [V], [V^], and [G^] are concealed values for matrices M, M^, V, V^, and G^ having the same number of elements as the gradient G, and $\hat{\beta}_{1,t}$, $\hat{\beta}_{2,t}$, and $\hat{g}$ are given by following equations, $$\frac{1}{1-\beta_1^t} = \hat{\beta}_{1,t}, \quad \frac{1}{1-\beta_2^t} = \hat{\beta}_{2,t}, \quad \frac{\eta}{\sqrt{\hat{v}}+\varepsilon} = \hat{g} \quad \text{[Math. 7]}$$

Adam is a function that calculates a secure batch mapping to output the concealed value [G^] of the matrix G^ of the value g^ with the concealed value [V^] of the matrix V^ of a value v^ as an input, a parameter update unit of each of the secure computation apparatuses calculates [M]←$\beta_1$ [M]+(1−$\beta_1$) [G], the parameter update unit calculates [V]←$\beta_2$ [V]+(1−$\beta_2$) [G]$\bigcirc$[G], the parameter update unit calculates [M^]←$\hat{\beta}_{1,t}$ [M], the parameter update unit calculates [V^] $\hat{\beta}_{2,t}$ [V], the parameter update unit calculates [G^]←Adam ([V^]), the parameter update unit calculates [G^]←[G^]$\bigcirc$ [M^], and the parameter update unit calculates [W]←[W]−[G^].

In order to solve the above problem, a secure deep learning method of a second aspect of the present invention is a secure deep learning method performed by a secure deep learning system including a plurality of secure computation apparatuses, the secure deep learning method learning a deep neural network while at least a feature X of learning data, and true data T and a parameter W of the learning data are kept concealed, wherein $\beta_1$, $\beta_2$, $\eta$, and $\varepsilon$ are predetermined hyperparameters, is a product of matrices, $\bigcirc$ is a product for each element, t is the number of learning times, [G] is a concealed value of a gradient G, [W] is a concealed value of the parameter W, [X] is a concealed value of the feature X of the learning data, [T] is a concealed value of a true label T of the learning data, [M], [M^], [V], [V^], [G^], [U], [Y], and [Z] are concealed values of matrices M, M^, V, V^, G^, U, Y, and Z having the same number of elements as the gradient G, and $\hat{\beta}_{1,t}$, $\hat{\beta}_{2,t}$, and $\hat{g}$ are given by following equations, $$\frac{1}{1-\beta_1^t} = \hat{\beta}_{1,t}, \quad \frac{1}{1-\beta_2^t} = \hat{\beta}_{2,t}, \quad \frac{\eta}{\sqrt{\hat{v}}+\varepsilon} = \hat{g} \quad \text{[Math. 8]}$$

Adam is a function that calculates a secure batch mapping to output the concealed value [G^] of the matrix G^ of the value g^ with the concealed value [V^] of the matrix V^ of a value v^ as an input, rshift is an arithmetic right shift, m is the number of pieces of learning data used for one learning, and H' is defined by a following equation, $$H' = \lfloor \log_2 m \rfloor \quad \text{[Math. 9]}$$

n is the number of hidden layers of the deep neural network, Activation is an activation function of the hidden layers, Activation2 is an activation function of an output layer of the deep neural network, Activation2' is a loss function corresponding to the activation function Activation2, Activation' is a derivative of the activation function Activation, a forward propagation calculation unit of each of the secure computation apparatuses calculates $[U^1] \leftarrow [W^0]$ ■$[X]$, the forward propagation calculation unit calculates $[Y^1] \leftarrow$ Activation $([U^1])$, the forward propagation calculation unit calculates $[U^{i+1}] \leftarrow [W^i]$■$[Y^i]$ for each i greater than or equal to 1 and less than or equal to n−1, the forward propagation calculation unit calculates $[Y^{i+1}] \leftarrow$ Activation $([U^{i+1}])$ for each i greater than or equal to 1 and less than or equal to n−1, the forward propagation calculation unit calculates $[U^{n+1}] \leftarrow [W^n]$■$[Y^n]$, the forward propagation calculation unit calculates $[Y^{n+1}] \leftarrow$ Activation2 $([U^{n+1}])$, a back propagation calculation unit of each of the secure computation apparatuses calculates $[Z^{n+1}] \leftarrow$ Activation2' $([Y^{n+1}], [T])$, the back propagation calculation unit calculates $[Z^n] \leftarrow$ Activation' $([U^n]) \bigcirc ([Z^{n+1}]$■$[W^n])$, the back propagation calculation unit calculates $[Z^{n-i}] \leftarrow$ Activation' $([U^{n-i}]) \bigcirc ([Z^{n-i+1}]$■$[W^{n-i}])$ for each i greater than or equal to 1 and less than or equal to n−1, a gradient calculation unit of each of the secure computation apparatuses calculates $[G^0] \leftarrow [Z^1]$■$[X]$, the gradient calculation unit calculates $[G^i] \leftarrow [Z^{i+1}]$■$[Y^i]$ for each i greater than or equal to 1 and less than or equal to n−1, the gradient calculation unit calculates $[G^n] \leftarrow [Z^{n+1}]$■$[Y^n]$, a parameter update unit of each of the secure computation apparatuses calculates $[G^0] \leftarrow$ rshift $([G^0], H')$, the parameter update unit calculates $[G^i] \leftarrow$ rshift $([G^i], H')$ for each i greater than or equal to 1 and less than or equal to n−1, the parameter update unit calculates $[G^n] \leftarrow$ rshift $([G^n], H')$, and the parameter update unit learns a parameter $[W^i]$ between an i layer and an i+1 layer using a gradient $[G^i]$ between the i layer and the i+1 layer, in accordance with the secure gradient descent computation method according to the first aspect, for each i greater than or equal to 0 and less than or equal to n.

Effects of the Invention

According to the present invention, the calculation of the gradient descent method in the secure computing can be performed at high speed while maintaining accuracy.

DESCRIPTION OF EMBODIMENTS

First, a notation method and definitions of terms herein will be described.
Notation Method In the following description, symbols "→" and "^" used in the text should originally be written directly above characters immediately before them, but are written immediately after the characters due to a limitation of text notation. In mathematical formulas, these symbols are written in their original positions, that is, directly above characters. For example, "a→" and "a^" is expressed by the following expression in a mathematical formula:

[Math. 10]

$$\vec{a}, \hat{a}$$

_ (underscore) in the appendix represents the subscript. For example, $x^{y\_z}$ represents $y_z$ is the superscript to x, and $x_{y\_z}$ represents $y_z$ is the subscript to x.

A vector is written as $a^{\rightarrow} := (a_0, \ldots, a_{n-1})$. a being defined by b is written as $a := b$. An internal product of two vectors $a^{\rightarrow}$ and $b^{\rightarrow}$ including the same number of elements is written as $a^{\rightarrow}$■$b^{\rightarrow}$. A product of two matrices is written as (■), and a product for each element of the two matrices or vectors is written as (◯). Those with which no operator is written represent scalar times.

[a] represents encrypted a that is encrypted by using secret sharing or the like, and is referred to as a "share".
Secure Batch Mapping A secure batch mappping is a function of calculating a lookup table, which is a technique that can arbitrarily define the domain of definition and range of values. The secure batch mapping performs processing in a vector unit, so the secure batch mapping has a property that it is effective in performing the same processing on a plurality of inputs. The following illustrates specific processing of the secure batch mapping.

The secure batch mapping, with the share column $[a^{\rightarrow}] := ([a_0], \ldots, [a_{m-1}])$, the domain of definition $(x_0, \ldots, x_{l-1})$, and the range of values $(y_0, \ldots, y_{l-1})$ as inputs, outputs a share with each input value mapped, specifically, a share column $([b_0], \ldots, [b_{m-1}])$ such that $x_j \leq a_i \leq x_{j+1}$ and $b_i = y_j$ for $0 \leq i < m$. See Reference Literature 1 for the details of the secure batch mapping.

Reference Literature 1: Koki Hamada, Dai Ikarashi, Koji Chida, "A Batch Mapping Algorithm for Secure Function Evaluation," IEICE Transactions A, Vol. 96, No. 4, pp. 157-165, 2013.
Arithmetic Right Shift With a share column $[a^{\rightarrow}] := ([a_0], \ldots, [a_{m-1}])$ and a public value t as inputs, $[b^{\rightarrow}] := ([b_0], \ldots, [b_{m-1}])$ in which each element of $[a^{\rightarrow}]$ is arithmetic right shifted by t bits is output. Hereinafter, the right shift is represented as rshift. The arithmetic right shift is a shift that performs padding on the left side by code bits rather than 0, and uses a logical right shift rlshift to configure rshift $([A*2^n], n-m)=[A*2^m]$, as in Equations (1) to (3). Note that the details of the logical right shift rlshift are referenced in Reference Literature 2.

[Math. 11]

$$[A' \times 2^n] = [A \times 2^n] + a \times 2^n (a \geq |A|) \quad (1)$$

$$[A' \times 2^m] = \text{rlshift}([A' \times 2^n], n-m) \quad (2)$$

$$[A \times 2^m] = [A' \times 2^m] - a \times 2^m \quad (3)$$

Reference Literature 2: Ibuki Mishina, Dai Ikarashi, Koki Hamada, Ryo Kikuchi, "Designs and Implementations of Efficient and Accurate Secret Logistic Regression," In CSS, 2018.
Optimization Technique Adam In a simple gradient descent method, the calculated gradient g is processed with $w = w - \eta g$ ($\eta$ is a learning rate) to update the parameter w. Meanwhile, in Adam, processing of Equations (4) to (8) is performed to the gradient to update the parameter. Processing to calculate the gradient g is the same process even in the case of a simple gradient descent method and in the case of applying Adam. Note that t is a variable representing what number the learning is, and $g_t$ represents the gradient of the t-th time. m, v, m^, and v^ are matrices of the same size as g, and are all initialized at 0. ■$^t$ (the upper appendix t) represents the t-power.

[Math. 12]

$$m_{t+1} = \beta_1 m_t + (1 - \beta_1) g_t \qquad (4)$$

$$v_{t+1} = \beta_2 v_t + (1 - \beta_2) g_t \circ g_t \qquad (5)$$

$$\hat{m}_{t+1} = \frac{1}{1 - \beta_1^t} m_{t+1} \qquad (6)$$

$$\hat{v}_{t+1} = \frac{1}{1 - \beta_2^t} v_{t+1} \qquad (7)$$

$$w_{t+1} = w_t - \frac{\eta}{\sqrt{\hat{v}_{t+1}} + \varepsilon} \circ \hat{m}_{t+1} \qquad (8)$$

Here $\beta_1$, $\beta_2$ is a constant close to 1, $\eta$ is the learning rate, and $\varepsilon$ is a value for preventing Equation (8) from being unable to calculate in the case of $\sqrt{\hat{v}}_{t+1}$=0. In the proposal article of Adam (Reference Literature 3), $\beta_1$=0.9, $\beta_2$=0.999, $\eta$=0.001, and $\varepsilon$=10$^{-8}$.

Reference Literature 3: Diederik P Kingma and Jimmy Ba, "Adam: A Method for Stochastic Optimization," arXiv preprint arXiv: 1412.6980, 2014.

In Adam, processing increases as compared to a simple gradient descent method, so the processing time required for a single learning increases. Meanwhile, the number of learning times required to converge decreases significantly, so the overall processing time required for learning is shortened.

Hereinafter, an embodiment of the present invention will be described in detail. Further, the same reference numerals are given to constituent elements having the same functions in the drawings, and repeated description will be omitted.

First Embodiment

In a first embodiment, the optimization technique Adam of a gradient descent method is implemented using a secure batch mapping while keeping a gradient, a parameter, and values during calculation concealed.

In the following description, $\beta_{1,t}$, $\beta_{2,t}$, $\hat{g}$ are defined by the following equations.

[Math. 13]

$$\frac{1}{1 - \beta_1^t} = \hat{\beta}_{1,t},$$

$$\frac{1}{1 - \beta_2^t} = \hat{\beta}_{2,t},$$

$$\frac{\eta}{\sqrt{\hat{v}} + \varepsilon} = \hat{g}$$

$\hat{\beta}_{1,t}$ and $\hat{\beta}_{2,t}$ are calculated in advance for each t. The calculation of $\hat{g}$ is achieved by using a secure batch mapping that uses v^ as an input and outputs $\eta/(\sqrt{\hat{v}}+\varepsilon)$. The secure batch mapping is labeled Adam (v^). Constants $\beta_1$, $\beta_2$, $\eta$, and $\varepsilon$ are plaintext. Because the calculation of g includes square root and division, the processing cost in the secure computing is large. However, using a secure batch mapping is efficient because it only requires a single process.

Figure 1:
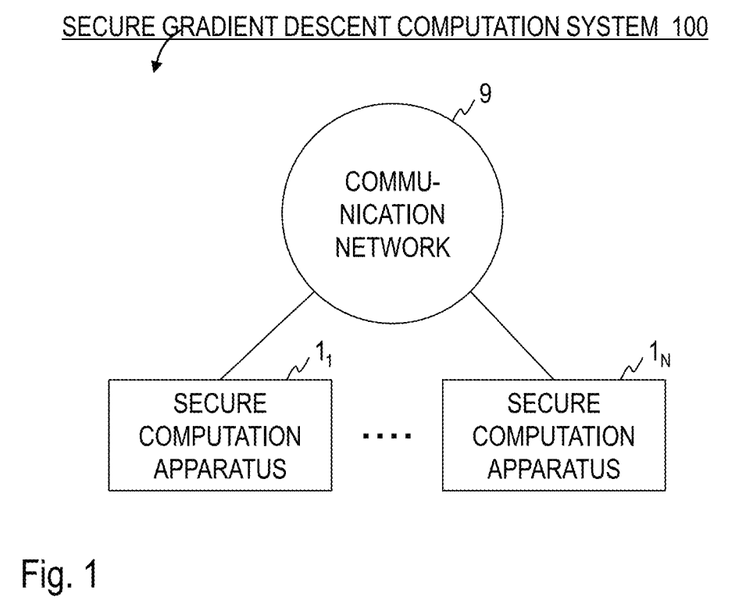
FIG. 1 is a diagram illustrating a functional configuration of a secure gradient descent computation system.

With reference to FIG. 1, an example of a configuration of a secure gradient descent computation system of the first embodiment will be described. The secure gradient descent computation system 100 includes N (≥2) secure computation apparatuses $1_1, \ldots, 1_N$, as illustrated in FIG. 1, for example. In the present embodiment, each of the secure computation apparatuses $1_1, \ldots, 1_N$ is connected to a communication network 9. The communication network 9 is a circuit-switched or packet-switched communication network configured to enable connected apparatuses to communicate with each other, and, for example, the Internet, a local area network (LAN), a wide area network (WAN), or the like can be used. Note that the apparatuses need not necessarily be able to communicate online via the communication network 9. For example, information to be input to the secure computation apparatuses $1_1, \ldots, 1_N$ may be stored in a portable recording medium such as a magnetic tape or a USB memory, and the information may be configured to be input from the portable recording medium to the secure computation apparatuses $1_1, \ldots, 1_N$ offline.

Figure 2:
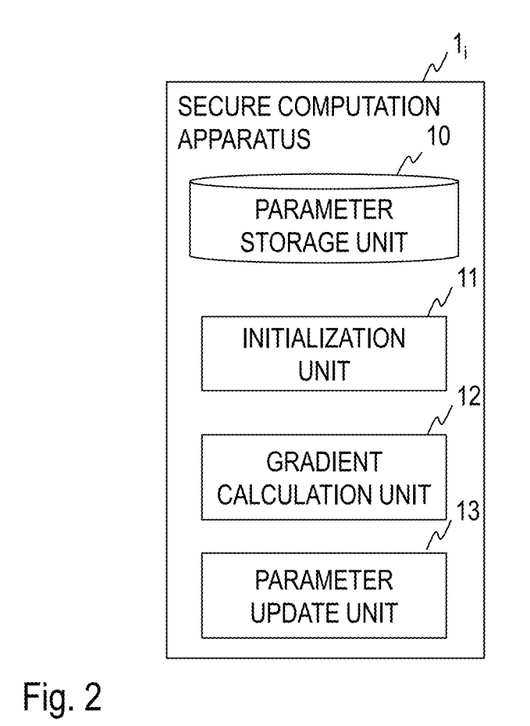
FIG. 2 is a diagram illustrating a functional configuration of a secure computation apparatus.

With reference to FIG. 2, an example of a configuration of a secure computation apparatus $1_i$ (i=1, ..., N) included in the secure gradient descent computation system 100 of the first embodiment will be described. As illustrated in FIG. 2, for example, the secure computation apparatus $1_i$ includes a parameter storage unit 10, an initialization unit 11, a gradient calculation unit 12, and a parameter update unit 13. The secure computation apparatus $1_i$ (i=1, ..., N) performs processing of each step described below while coordinating with other secure computation apparatuses $1_{i'}$ (i'=1, ..., N, where i≠i'), thereby implementing the secure gradient descent computation method of the present embodiment.

The secure computation apparatus $1_i$ is a special apparatus configured by causing, for example, a known or dedicated computer including a central processing unit (CPU), a main storage apparatus (a random access memory or RAM), and the like to read a special program. The secure computation apparatus $1_i$, for example, executes each processing under control of the central processing unit. Data input to the secure computation apparatus $1_i$ and data obtained in each processing are stored in the main storage apparatus, for example, and the data stored in the main storage apparatus is read by the central processing unit as needed to be used for other processing. At least a portion of processing units of the secure computation apparatus $1_i$ may be constituted with hardware such as an integrated circuit. Each storage unit included in the secure computation apparatus $1_i$ may be configured by, for example, the main storage apparatus such as the random access memory (RAM), an auxiliary storage apparatus configured with a hard disk, an optical disc, or a semiconductor memory element such as a flash memory, or middleware such as a relational database or a key-value store.

Figure 3:
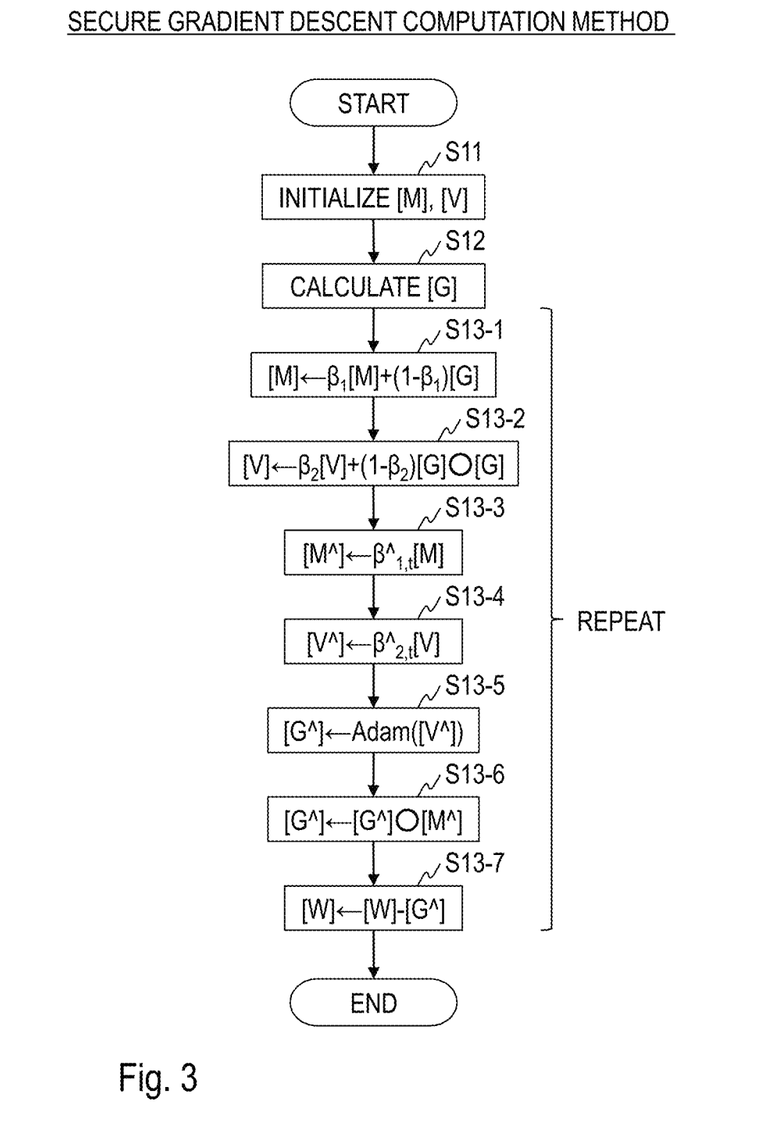
FIG. 3 is a diagram illustrating a processing procedure of a secure gradient descent computation method.

With reference to FIG. 3, a processing procedure of the secure gradient descent computation method performed by the secure gradient descent computation system 100 of the first embodiment will be described.

The parameter storage unit 10 stores predetermined hyperparameters $\beta_1$, $\beta_2$, $\eta$, and $\varepsilon$. These hyperparameters may be set to the values described in Reference Literature 3, for example. The parameter storage unit 10 stores pre-calculated hyperparameters $\hat{\beta}_{1,t}$ and $\hat{\beta}_{2,t}$. Furthermore, the parameter storage unit 10 stores a secure batch mapping Adam set with a domain of definition and a range of values in advance.

At step S12, the gradient calculation unit 12 of each secure computation apparatus $1_i$ calculates the concealed value [G] of the gradient G. The gradient calculation unit 12 may calculate the gradient G in a manner normally performed in processing of the subject to which a gradient descent method is applied (e.g., logistic regression, learning of neural networks, and the like). The gradient calculation unit 12 outputs the concealed value [G] of the gradient G to the parameter update unit 13.

At step S12, the gradient calculation unit 12 of each secure computation apparatus $1_i$ calculates the concealed value [G] of the gradient G. The gradient calculation unit 12 may calculate the gradient G in a manner normally performed in processing of the subject to which a gradient descent method is applied (e.g., logistic regression, learning of neural networks, and the like). The gradient calculation unit 11 outputs the concealed value [G] of the gradient G to the parameter update unit 13.

At step S13-1, the parameter update unit 13 of each secure computation apparatus $1_i$ calculates $[M] \leftarrow \beta_1 [M]+(1-\beta_1)[G]$ by using the hyperparameter pi stored in the parameter storage unit 10, and updates the concealed value [M] of the matrix M.

At step S13-2, the parameter update unit 13 of each secure computation apparatus $1_i$ calculates $[V] \leftarrow \beta_2 [V]+(1-\beta_2)[G]\odot[G]$ by using the hyperparameter $\beta_2$ stored in the parameter storage unit 10, and updates the concealed value [V] of the matrix V.

At step S13-3, the parameter update unit 13 of each secure computation apparatus $1_i$ calculates $[M\hat{\ }]\leftarrow\beta\hat{\ }_{1,t}[M]$ by using the hyperparameter $\beta\hat{\ }_{1,t}$ stored in the parameter storage unit 10, and generates the concealed value [M^] of the matrix M^. The matrix M^ is a matrix having the same number of elements as the matrix M (i.e., having the same number of elements as the gradient G).

At step S13-4, the parameter update unit 13 of each secure computation apparatus $1_i$ calculates $[V\hat{\ }]\leftarrow\beta\hat{\ }_{2,t}[V]$ by using the hyperparameter $\beta\hat{\ }_{2,t}$ stored in the parameter storage unit 10, and generates the concealed value [V^] of the matrix V^. The matrix V^ is a matrix having the same number of elements as the matrix V (i.e., having the same number of elements as the gradient G).

At step S13-5, the parameter update unit 13 of each secure computation apparatus $1_i$ calculates [G^]←Adam ([V^]) by using the secure batch mapping Adam, and generates the concealed value [G^] of the matrix G^. The matrix G^ is a matrix having the same number of elements as the matrix V^ (i.e., having the same number of elements as the gradient G).

At step S13-6, the parameter update unit 13 of each secure computation apparatus $1_i$ calculates [G^]←[G^]⊙[M^] and updates the concealed value [G^] of the gradient G^.

At step S13-7, the parameter update unit 13 of each secure computation apparatus $1_i$ calculates [W]←[W]−[G^] and updates the concealed value [W] of the parameter W.

The algorithm for the parameter update performed from step S13-1 to step S13-7 by the parameter update unit 13 of the present embodiment will be indicated in Algorithm 1.

---

Algorithm 1: Secure Computation Adam
Algorithm Using Secure Batch Mapping

Input 1: Gradient [G]
Input 2: Parameter [W]
Input 3: [M], [V] initialized at 0
Input 4: Hyperparameters $\beta_1, \beta_2, \beta\hat{\ }_{1,t}, \beta\hat{\ }_{2,t}$
Input 5: Number of learning times t
Output 1: Updated parameter [W]
Output 2: Updated [M], [V]
1: $[M] \leftarrow \beta_1 [M] + (1 - \beta_1) [G]$

---

Algorithm 1: Secure Computation Adam
Algorithm Using Secure Batch Mapping

2: $[V] \leftarrow \beta_2 [V] + (1 - \beta_2) [G] \odot [G]$
3: $[M\hat{\ }] \leftarrow \beta\hat{\ }_{1,t} [M]$
4: $[V\hat{\ }] \leftarrow \beta\hat{\ }_{2,t} [V]$
5: $[G\hat{\ }] \leftarrow$ Adam $([V\hat{\ }])$
6: $[G\hat{\ }] \leftarrow [G\hat{\ }] \odot [M\hat{\ }]$
7: $[W] \leftarrow [W] - [G\hat{\ }]$

---

Modification Example 1 of First Embodiment

In Modification Example 1, a method of creating a table including a domain of definition and a range of values in a case of configuring the secure batch mapping Adam used in the first embodiment is devised.

V^ input to the secure batch mapping Adam is always positive. The secure batch mapping Adam is a monotonically decreasing function with a very large gradient at a portion where V^ is close to 0, and has a feature that Adam (V^) gently approaches zero when V^ increases. Because secure computing processes with fixed point numbers in terms of processing costs, very small decimal fractions such as those handled with floating point numbers are not handled. In other words, because a very small V^ is not input, the range of the values of the output of Adam (V^) need not be set to a large value. For example, the maximum value of Adam (V^) may be around one in a case where each of the hyperparameters is set as in Reference Literature 3 and the accuracy below the decimal point of V^ is set to 20 bits. Because the minimum value of Adam (V^) may be determined depending on the accuracy of Adam (V^) required, the size of the table of mapping can be determined by determining the accuracy of the input V^ and the output Adam (V^).

Modification Example 2 of First Embodiment

In Modification Example 2, the accuracy of each variable is further set as illustrated in Table 1 in the first embodiment.

TABLE 1

| VARIABLE | ACCURACY (BIT) |
| --- | --- |
| w | $b_w$ |
| $\beta_1, \beta_2$ | $b_\beta$ |
| $\beta\hat{\ }_{1,t}$ | $b_{\beta\hat{\ }\_1}$ |
| $\beta\hat{\ }_{2,t}$ | $b_{\beta\hat{\ }\_2}$ |
| g | $b_{g\hat{\ }}$ |

Figure 4:
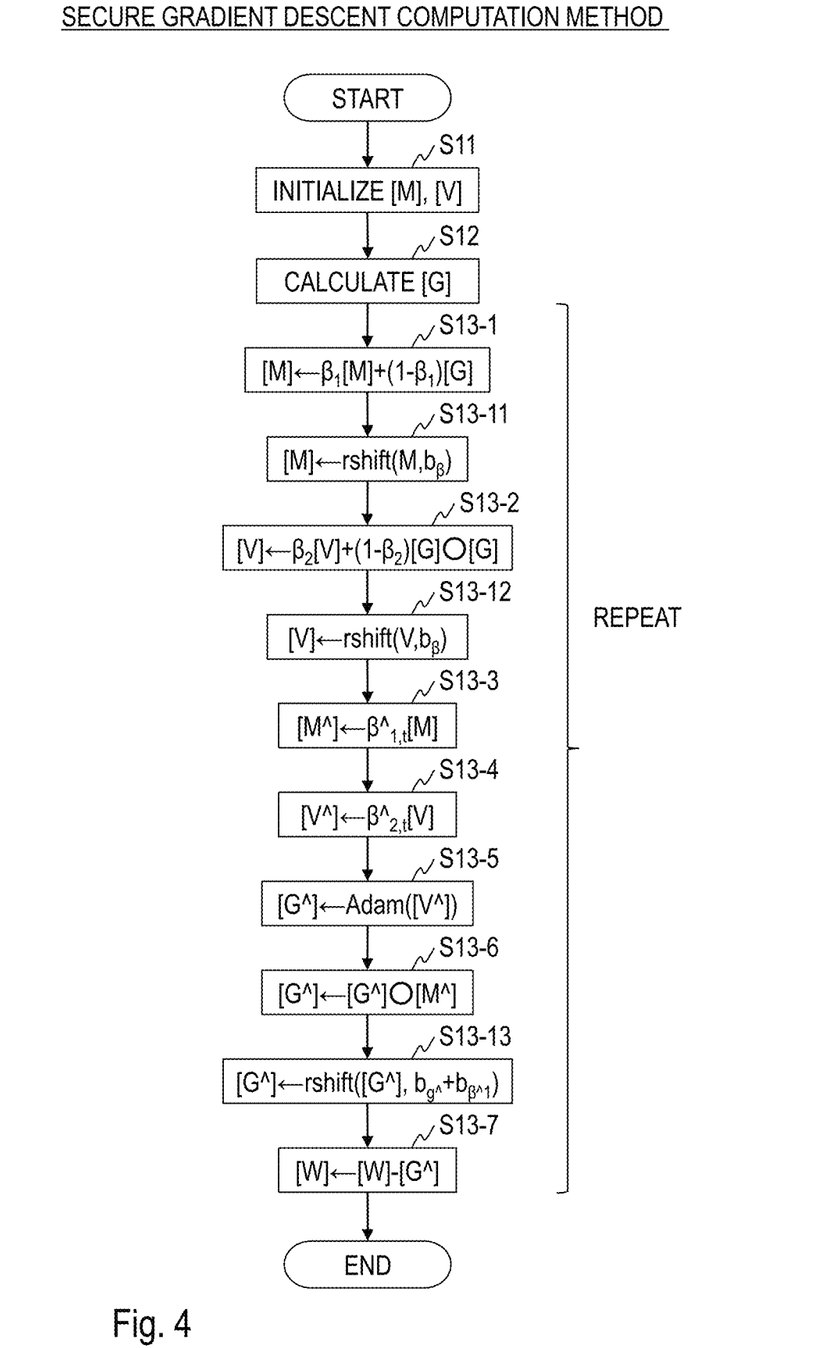
FIG. 4 is a diagram illustrating a processing procedure of a secure gradient descent computation method.

As illustrated in FIG. 4, the parameter update unit 13 of the present modification example performs step S13-11 after step S13-1, performs step S13-12 after step S13-2, and performs step S13-13 after step S13-6.

At step S13-11, the parameter update unit 13 of each secure computation apparatus $1_i$ arithmetic right shifts the concealed value [M] of the matrix M by $b_\beta$ bits. In other words, [M] rshift ([M], $b_\beta$) is calculated and the concealed value [M] of the matrix M is updated.

At step S13-12, the parameter update unit 13 of each secure computation apparatus $1_i$ arithmetic right shifts the concealed value [V] of the matrix V by $b_\beta$ bits. In other words, [V] rshift ([V], $b_\beta$) is calculated and the concealed value [V] of the matrix V is updated.

At step S13-13, the parameter update unit 13 of each secure computation apparatus $1_i$ arithmetic right shifts the concealed value [G^] of the matrix G^ by $b_{g^{\wedge}}+b_{\beta^{\wedge}\_1}$ bits. In other words, [G^]←rshift ([G^], $b_{g^{\wedge}}+b_{\beta^{\wedge}\_1}$) is calculated and the concealed value [G^] of the matrix G^ is updated.

The algorithm for the parameter update performed from step S13-1 to S13-7 and from S13-11 to S13-13 by the parameter update unit 13 of the present modification example will be indicated in Algorithm 2.

---

Algorithm 2: Secure Computation Adam
Algorithm Using Secure Batch Mapping

---

Input 1: Gradient [G]
Input 2: Parameter [W]
Input 3: [M], [V] initialized at 0
Input 4: Hyperparameters $\beta_1$, $\beta_2$, $\beta^{\wedge}_{1, t}$, $\beta^{\wedge}_{2, t}$
Input 5: Number of learning times t
Output 1: Updated parameter [W]
Output 2: Updated [M], [V]

| | |
|---|---|
| 1: [M] ← $\beta_1$ [M] + (1 − $\beta_1$) [G] | (accuracy: $b_w + b_\beta$) |
| 2: [M] ← rshift ([M], $b_\beta$) | (accuracy: $b_w$) |
| 3: [V] ← $\beta_2$ [V] + (1 − $\beta_2$) [G] ○ [G] | (accuracy: $2b_w + b_\beta$) |
| 4: [V] ← rshift ([V], $b_\beta$) | (accuracy: $2b_w$) |
| 5: [M^] ← $\beta^{\wedge}_{1, t}$ [M] | (accuracy: $b_w + b_{\beta^{\wedge}\_1}$) |
| 6: [V^] ← $\beta^{\wedge}_{2, t}$ [V] | (accuracy: $2b_w + b_{\beta^{\wedge}\_2}$) |
| 7: [G^] ← Adam ([ V^]) | (accuracy: $b_{g^{\wedge}}$) |
| 8: [G^] ← [G^] ○ [M^] | (accuracy: $b_{g^{\wedge}} + b_w + b_{\beta^{\wedge}\_1}$) |
| 9: [G^] ← rshift ([G^], $b_{g^{\wedge}} + b_{\beta^{\wedge}\_1}$) | (accuracy: $b_w$) |
| 10: [W] ← [W] − [G^] | (accuracy: $b_w$) |

---

In the present modification example, the accuracy setting is devised as follows. Here, "accuracy" indicates the number of bits in the decimal point portion, and, for example, in a case where the variable w is set to the accurate by, bit, the actual value is $w*2^{b\_w}$. The range of values is different for each variable and thus accuracy may be determined depending on the range of values. For example, w is likely to be a small value and parameters are very important values in machine learning, so the accuracy of the decimal point portion may be increased. Meanwhile, because the hyperparameters $\beta_2$, and the like are set to approximately 0.9 or 0.999 in Reference Literature 3, there is a low need to increase the accuracy of the decimal point portion. By devising in this manner, the overall number of bits can be suppressed as much as possible, and a secure computing with a large processing cost can be efficiently calculated.

In the present modification example, the following factors are devised for the right shift. For secure computing, processing at fixed point numbers rather than floating point numbers results in high speed in terms of processing costs. Here, fixed point numbers change the decimal point positions every time of multiplication, so it is necessary to adjust the decimal point positions by the right shift. However, because the right shift in the secure computing is a large cost processing, the number of right shifts may be reduced as much as possible. Because the secure batch mapping has the property of being able to arbitrarily set the range of values and the domain of definition. it is possible to adjust the number of digits as in the right shift. From such characteristics of the secure computing and the secure batch mapping, processing as in the present modification example may be more efficient.

Second Embodiment

In a second embodiment, the deep learning is performed by the optimization technique Adam implemented using the secure batch mapping. In this example, learning data, a learning label, and parameters are kept concealed to perform the deep learning. Anything may be used for an activation function used in a hidden layer and an output layer, and a shape of a model of a neural network is arbitrary. Here, it is assumed to learn a deep neural network with the number of hidden layers being n layers. In other words, in a case where L is the layer number, the input layer is L=0, and the output layer is L=n+1. According to the second embodiment, a favorable learning result can be obtained even with a small number of learning times as compared to conventional techniques using a simple gradient descent method.

Figure 5:
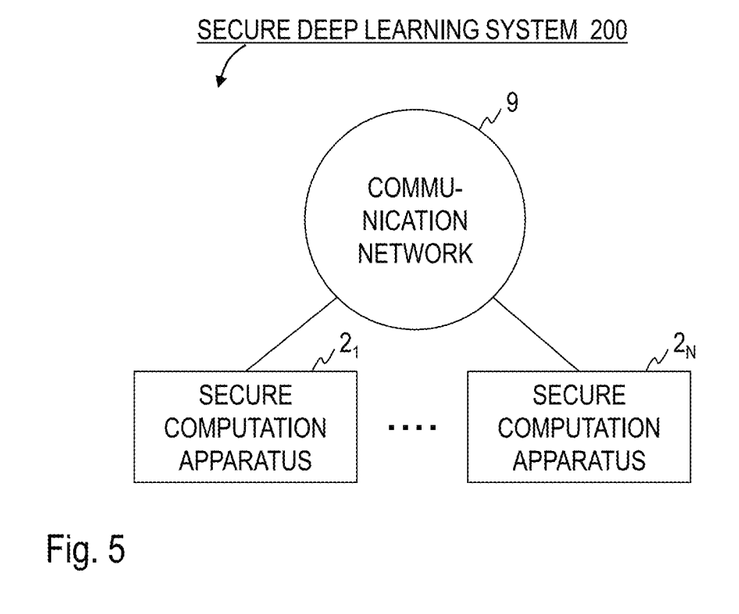
FIG. 5 is a diagram illustrating a functional configuration of a secure deep learning system.

With reference to FIG. 5, an example of a configuration of a secure deep learning system of the second embodiment will be described. The secure deep learning system 200 includes N (≥2) secure computation apparatuses $2_i, \ldots, 2_N$, as illustrated in FIG. 5, for example. In the present embodiment, each of the secure computation apparatuses $2_1, \ldots, 2_N$ is connected to a communication network 9. The communication network 9 is a circuit-switched or packet-switched communication network configured to enable connected apparatuses to communicate with each other, and, for example, the Internet, a local area network (LAN), a wide area network (WAN), or the like can be used. Note that the apparatuses need not necessarily be able to communicate online via the communication network 9. For example, information to be input to the secure computation apparatuses $2_i, \ldots, 2_N$ may be stored in a portable recording medium such as a magnetic tape or a USB memory, and the information may be configured to be input from the portable recording medium to the secure computation apparatuses $2_i, \ldots, 2_N$ offline.

Figure 6:
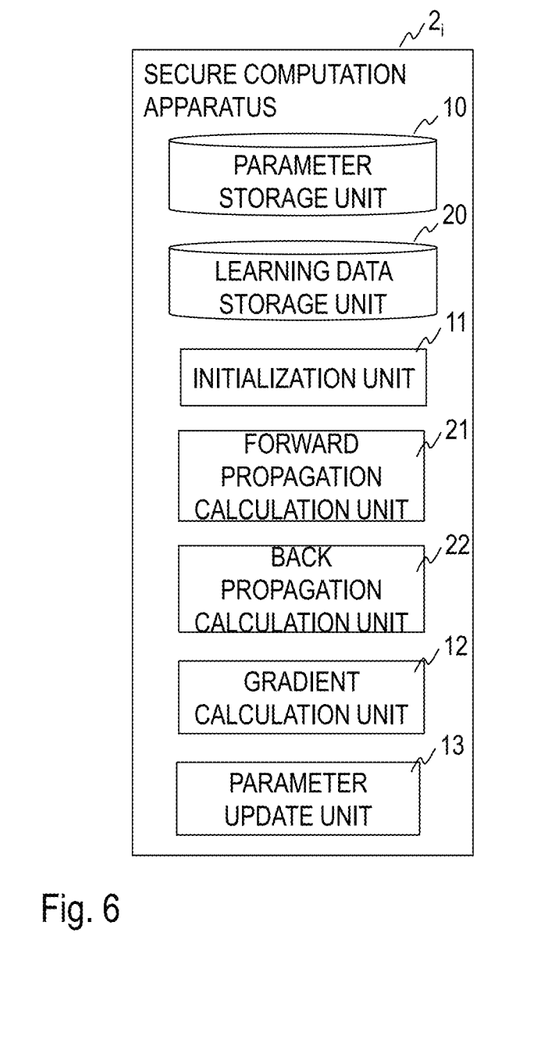
FIG. 6 is a diagram illustrating a functional configuration of a secure computation apparatus.

With reference to FIG. 6, an example of a configuration of a secure computation apparatus $2_i$ (i=1, . . . , N) included in the secure deep learning system 200 of the second embodiment will be described. As illustrated in FIG. 6, for example, the secure computation apparatus $2_i$ includes a parameter storage unit 10, an initialization unit 11, a gradient calculation unit 12, and a parameter update unit 13, as in the first embodiment, and further includes a learning data storage unit 20, a forward propagation calculation unit 21, and a back propagation calculation unit 22. The secure computation apparatus $2_i$ (i=1, . . . , N) performs processing of each step described below while coordinating with other secure computation apparatuses $2_{i'}$ (i'=1, . . . , N, where i≠i'), thereby implementing the secure deep learning method of the present embodiment.

Figure 7:
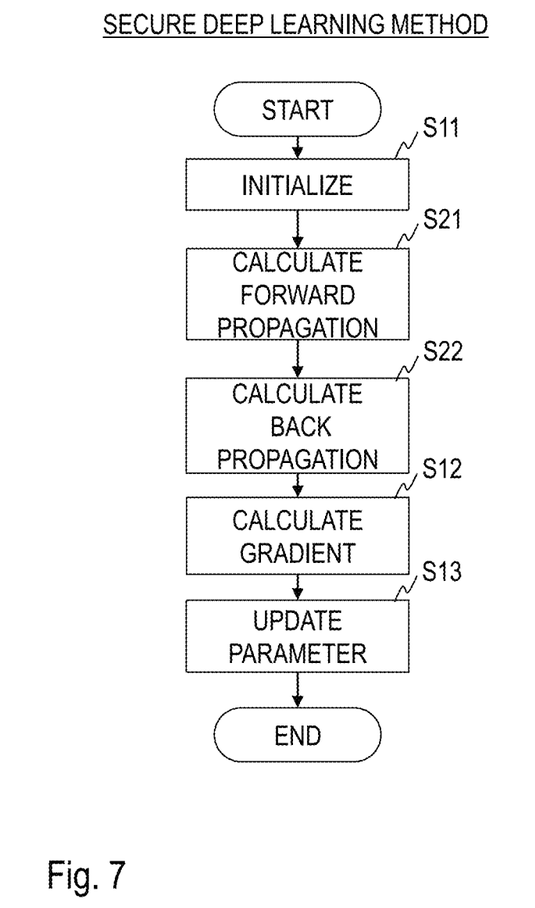
FIG. 7 is a diagram illustrating a processing procedure of a secure deep learning method.

With reference to FIG. 7, a processing procedure of the secure deep learning method performed by the secure deep learning system 200 of the second embodiment will be described.

The learning data storage unit 20 stores a concealed value [X] of a feature X of the learning data and a concealed value [T] of a true label T of the learning data.

At step S11, the initialization unit 11 of each secure computation apparatus $2_i$ initializes a concealed value [W]:= ([$W^0$], . . . , [$W^n$]) of a parameter W. The method of initializing the parameter is selected depending on an activation function, and the like. For example, it is known that in a case where an ReLU function is used for the activation function of an intermediate layer, a favorable learning result can be obtained by using the initialization method described in Reference Literature 4.

Reference Literature 4: Kaiming He, Xiangyu Zhang, Shaoqing Ren, and Jian Sun, "Delving Deep into Rectifiers: Surpassing Human-Level Performance on ImageNet Classification," In Proceedings of the IEEE international conference on computer vision, pp. 1026-1034, 2015.

At step S21, the forward propagation calculation unit 21 of each secure computation apparatus $2_i$ calculates forward propagation by using the concealed value [X] of the feature of the learning data, and determines a concealed value [Y] of an output of each layer ([Y]:=[$Y^1$], . . . , [$Y^{n+1}$]). Specifically, the forward propagation calculation unit 21 calculates [$U^1$]←[$W^0$]■[X], [$Y^1$]←Activation ([$U^1$]), calculates [$U^{i+1}$]←[$W^i$]■[$Y^i$], [$Y^{i+1}$]←Activation ([$U^{i+1}$]) for each integer i greater than or equal to 1 and less than or equal to n−1, and calculates [$U^{n+1}$]←[$W^n$]■[$Y^n$], [$Y^{n+1}$]←Activation2 ([$U^{n+1}$]). Here, Activation represents an activation function of any hidden layer, and Activation2 represents an activation function of any output layer.

At step S22, the back propagation calculation unit 22 of each secure computation apparatus $2_i$ calculates the back propagation using the concealed value [T] of the true label of the learning data, and determines the concealed value [Z]:=([$Z^1$], . . . , [$Z^{n+1}$]) of the error of each layer. Specifically, the back propagation calculation unit 22 calculate [$Z^{n+1}$]←Activation2' ([$Y^{n+1}$], [T]), [$Z^n$]←Activation' ([$U^n$]) ○([$Z^{n+1}$]■[$W^n$]) and calculates [$Z^{n-i}$]←Activation' ([$U^{n-i}$]) ○([$Z^{n-i+1}$]■[$W^{n-i}$]) for each integer i greater than or equal to 1 and less than or equal to n−1. Here, Activation' represents the derivative of the activation function Activation, and Activation2' represents a loss function corresponding to the activation function Activation2.

At step S12, the gradient calculation unit 12 of each secure computation apparatus $2_i$ calculates the concealed value [G]:=([$G^0$], . . . , [$G^n$]) of the gradient of each layer by using the concealed value [X] of the feature of the learning data, the concealed value [Z] for the error of each layer, and the concealed value [Y] of the output of each layer. Specifically, the gradient calculation unit 12 calculates [$G^0$]←[$Z^1$]■[X], calculates [$G^i$]←[$Z^{i+1}$]■[$Y^i$] for each integer i greater than or equal to 1 and less than or equal to n−1, and calculates [$G^n$]←[$Z^{n+1}$]■[$Y^n$].

At step S13, the parameter update unit 13 of each secure computation apparatus $2_i$ shifts the concealed value [G] of the gradient of each layer by the right shift by the shift amount H', and then updates the concealed value [W]:= ([$W^0$], . . . , [$W^n$]) of the parameter of each layer according to the secure gradient descent computation method of the first embodiment. Specifically, the parameter update unit 13 first calculates [$G^0$]←rshift ([$G^0$], H'), calculates [$G^i$]←rshift ([$G^i$], H') for each integer i greater than or equal to 1 and less than or equal to n−1, and calculates [$G^n$]←rshift ([$G^n$], H'). Next, for each integer i greater than or equal to 0 and less than or equal to n, the parameter update unit 13 calculates [$M^i$]←$\beta_1$ [$M^i$]+(1−[$G^i$], [$V^i$] $\beta_2$ [$V^i$]+(1−$\beta_2$) [$G^i$] ○[$G^i$], [$M^{\wedge i}$]←$\beta^{\wedge}_{1,t}$ [$M^i$], [$V^{\wedge i}$]←$\beta^{\wedge}_{2,t}$ [$V^i$], [$G^{\wedge i}$]←Adam ([$V^{\wedge i}$]), [$G^{\wedge i}$]←[$G^{\wedge i}$]○[$M^{\wedge i}$], [$W^i$]←[$W^i$]−[$G^{\wedge i}$].

The algorithm of the deep learning by Adam using the secure batch mapping performed by the secure deep learning system 200 of the present embodiment will be illustrated in Algorithm 3.

---

Algorithm 3: Deep Learning Algorithm
by Adam Using Secure Batch Mapping

---

Input 1: Feature [X] of learning data
Input 2: True label [T] of learning data
Input 3: Parameter [$W^l$] between l layer and l + 1
Output: Updated parameter [$W^l$]
1: Initialize all [W]
2: (1) Calculation of forward propagation
3: [$U^1$] ← [$W^0$] ■ [X]
4: [$Y^1$] ← Activation ([$U^1$])

---

Algorithm 3: Deep Learning Algorithm
by Adam Using Secure Batch Mapping

---

5: for i = 1 to n − 1 do
6: [$U^{i+1}$] ← [$W^i$] ■ [$Y^i$]
7: [$Y^{i+1}$] ← Activation ([$U^{i+1}$])
8: end for
9: [$U^{n+1}$] ← [$W^n$] ■ [$Y^n$]
10: [$Y^{n+1}$] Activation2 ([$U^{n+1}$])
11: (2) Calculation of back propagation
12: [$Z^{n+1}$] Activation2' ([$Y^{n+1}$], [T])
13: [$Z^n$] ← Activation' ([$U^n$]) ○ ([$Z^{n+1}$] ■ [$W^n$])
14: for i = 1 to n − 1 do
15: [$Z^{n-i}$] ← Activation' ([$U^{n-i}$]) ○ ([$Z^{n-i+1}$] ■ [$W^{n-i}$])
16: end for
17: (3) Calculation of gradient
18: [$G^0$] ← [$Z^1$] ■ [X]
19: for i = 1 to n − 1 do
20: [$G^i$] ← [$Z^{i+1}$] ■ [$Y^i$]
21: end for
22: [$G^n$] ← [$Z^{n+1}$] ■ [$Y^n$]
23: (4) Update of parameter
24: [$G^0$] ← rshift ([$G^0$], H')
25: for i = 1 to n − 1 do
26: [$G^i$] ← rshift ([$G^i$], H')
27: end for
28: [$G^n$] ← rshift ([$G^n$], H')
29: for i = 0 to n do
30: [$M^i$] ← $\beta_1$ [$M^i$] + (1 − $\beta_1$) [$G^i$]
31: [$V^i$] ← $\beta_2$ [$V^i$] + (1 − $\beta_2$) [$G^i$] ○ [$G^i$]
32: [$M^{\wedge i}$] ← $\beta^{\wedge}_{1,t}$ [$M^i$]
33: [$V^{\wedge i}$] ← $\beta^{\wedge}_{2,t}$ [$V^i$]
34: [$G^{\wedge i}$] ← Adam ([$V^{\wedge i}$])
35: [$G^{\wedge i}$] ← [$G^{\wedge i}$] ○ [$M^{\wedge i}$]
36: [$W^i$] ← [$W^i$] − [$G^{\wedge i}$]
37: end for

---

In the actual deep learning, processing other than the initialization of the parameters of the procedure 1 of Algorithm 3 is performed for the preset number of learning times or until convergence, such as until the amount of change of the parameter becomes sufficiently small.

(1) In the forward propagation calculation, the input layer, the hidden layer, and the output layer are calculated in this order, and (2) in the back propagation calculation, the output layer, the hidden layer, and the input layer are calculated in this order. However, because (3) the gradient calculation and (4) the parameter update can be processed in parallel for each of the layers, the efficiency of the processing can be increased by processing together.

In the present embodiment, the activation function of the output layer and the hidden layer may be set as follows. The activation function used in the output layer is selected in accordance with the analysis to be performed. An identity function f(x)=x is used in the case of numerical prediction (regression analysis), a sigmoid function $1/(1+\exp(-x))$ is used in the case of a binary classification such as diagnosis of disease and spam determination, a softmax function softmax $(u_i)=\exp(u_i)/\Sigma_{j=1}^{k} \exp(u_j)$ is used in the case of classification problems of ternary values or more such as an image classification, and the like. A non-linear function is chosen for the activation function used in the hidden layer, and the ReLU function ReLU (u)=max (0, u) is frequently used in recent years. The ReLU function is known to provide favorable learning results even in deep networks and is frequently used in the field of deep learning.

In the present embodiment, the batch size may be set as follows. In a case of calculating the gradient, processing the division by the batch size m with rshift is efficient. As such, the batch size m may be set to a value of a power of 2, and the amount of shift H' at this time is determined by Equation (9). The batch size is the number of pieces of learning data used in a single learning.

[Math. 14]

$$H'=\lfloor \log_2 m \rfloor \quad (9)$$

Modification Example 1 of Second Embodiment

In the deep learning of the second embodiment, the accuracy of each value used for learning is set as illustrated in Table 2. w is a parameter between each layer, x is learning data, t is true data (teacher data) corresponding to each learning data. The output of the activation function of the hidden layer is processed to be the same as the accuracy of the true data. $\hat{g}$ is the value obtained by the calculation of the secure batch mapping Adam.

TABLE 2

| VARIABLE | ACCURACY (BIT) |
|---|---|
| w | $b_w$ |
| x | $b_x$ |
| t | $b_y$ |
| $\beta_1, \beta_2$ | $b_\beta$ |
| $\hat{\beta}_{1,t}$ | $b_{\hat{\beta}\_1}$ |
| $\hat{\beta}_{2,t}$ | $b_{\hat{\beta}\_2}$ |
| g | $b_{\hat{g}}$ |

The forward propagation calculation unit 21 of the present modification example calculates the concealed value $[Y^{i+1}]$ of the output of the i+1 layer for each integer i greater than or equal to 1 and less than or equal to n−1, and then shifts $[Y^{i+1}]$ by right shift by $b_w$ bits. In other words, $[Y^{i+1}]\leftarrow$ rshift $([Y^{i+1}], b_w)$ is calculated.

The back propagation calculation unit 22 of the present modification example calculates the concealed value $[Z^n]$ of the error in the n layer, and then arithmetic right shifts $[Z^n]$ $b_y, b_y$ bits. In other words, $[Z^n]\leftarrow$ rshift $([Z^n], b_y)$ is calculated. The back propagation calculation unit 22 calculates the concealed value $[Z^{n-i}]$ of the error of the n−i layer for each integer i greater than or equal to 1 and less than or equal to n−1, and then arithmetic right shifts $[Z^{n-i}]$ by $b_w$ bits. In other words, $[Z^{n-i}]\leftarrow$ rshift $([Z^{n-i}], b_w)$ is calculated.

In the parameter update unit 13 of the present modification example, the concealed value $[G^0]$ of the gradient between the input layer and first layer of the hidden layers is arithmetic right shifted by the shift amount $b_x+H'$, the concealed value $[G^1], \ldots, [G^{n-1}]$ of the gradient between the hidden layers from the first layer to the n layer is arithmetic right shifted by the shift amount $b_w+b_x+H'$, and the concealed value $[G^n]$ of the gradient between the n layer of the hidden layers and the output layer is arithmetic right shifted by the shift amount $b_x+b_y+H'$. The concealed value $[W]:=([W^0], \ldots, [W^n])$ of the parameter of each layer is updated in accordance with the secure gradient descent computation method of Modification Example 2 of the first embodiment.

The algorithm of the deep learning by Adam using the secure batch mapping performed by the secure deep learning system 200 of the present modification example will be illustrated in Algorithm 4.

---

Algorithm 4: Deep Learning Algorithm by Adam Using Secure Batch Mapping

Input 1: Feature [X] of learning data
Input 2: True label [T] of learning data
Input 3: Parameter $[W^1]$ between 1 layer and 1 + 1
Output: Updated parameter $[W^1]$
1: Initialize all [W]                                      (accuracy: $b_w$)
2: (1) Calculation of forward propagation
3: $[U^1] \leftarrow [W^0] \blacksquare [X]$               (accuracy: $b_w + b_x$)
4: $[Y^1] \leftarrow$ ReLU $([U^1])$                       (accuracy: $b_w + b_x$)
5: for i = 1 to n − 1 do
6: $[U^{i+1}] \leftarrow [W^i] \blacksquare [Y^i]$          (accuracy: $2b_w + b_x$)
7: $[Y^{i+1}] \leftarrow$ ReLU $([U^{i+1}])$               (accuracy: $2b_w + b_x$)
8: $[Y^{i+1}] \leftarrow$ rshift $([Y^{i+1}], b_w)$        (accuracy: $b_w + b_x$)
9: end for
10: $[U^{n+1}] \leftarrow [W^n] \blacksquare [Y^n]$         (accuracy: $2b_w + b_x$)
11: $[Y^{n+1}] \leftarrow$ softmax $([U^{n+1}])$           (accuracy: $b_y$)
12: (2) Calculation of back propagation
13: $[Z^{n+1}] \leftarrow [Y^{n+1}] - [T]$                 (accuracy: $b_y$)
14: $[Z^n] \leftarrow$ ReLU' $([U^n]) \bigcirc ([Z^{n+1}] \blacksquare [W^n])$  (accuracy: $b_w + b_y$)
15: $[Z^n] \leftarrow$ rshift $([Z^n], b_y)$               (accuracy: $b_w$)
16: for i = 1 to n − 1 do
17: $[Z^{n-i}] \leftarrow$ ReLU' $([U^{n-i}]) \bigcirc ([Z^{n-i+1}] \blacksquare [W^{n-i}])$  (accuracy: $2b_w$)
18: $[Z^{n-i}] \leftarrow$ rshift $([Z^{n-i}], b_w)$       (accuracy: $b_w$)
19: end for
20: (3) Calculation of gradient
21: $[G^0] \leftarrow [Z^1] \blacksquare [X]$              (accuracy: $b_w + b_x$)
22: for i = 1 to n − 1 do
23: $[G^i] \leftarrow [Z^{i+1}] \blacksquare [Y^i]$        (accuracy: $2b_w + b_x$)
24: end for
25: $[G^n] \leftarrow [Z^{n+1}] \blacksquare [Y^n]$        (accuracy: $b_w + b_x + b_y$)
26: (4) Update of parameter
27: $[G^0] \leftarrow$ rshift $([G^0], b_x + H')$          (accuracy: $b_w$)
28: for i = 1 to n − 1 do
29: $[G^i] \leftarrow$ rshift $([G^i], b_w + b_x + H')$    (accuracy: $b_w$)
30: end for
31: $[G^n] \leftarrow$ rshift $([G^n], b_x + b_y + H')$    (accuracy: $b_w$)
32: for i = 0 to n do
33: $[M^i] \leftarrow \beta_1 [M^i] + (1 - \beta_1) [G^i]$  (accuracy: $b_w + b_\beta$)
34: $[M^i] \leftarrow$ rshift $([M^i], b_\beta)$            (accuracy: $b_w$)
35: $[V^i] \leftarrow \beta_2 [V^i] + (1 - \beta_2) [G^i] \bigcirc [G^i]$  (accuracy: $2b_w + b_\beta$)
36: $[V^i] \leftarrow$ rshift $([V^i], b_\beta)$            (accuracy: $2b_w$)
37: $[\hat{M}^i] \leftarrow \hat{\beta}_{1,t} [M^i]$        (accuracy: $b_w + b_{\hat{\beta}\_1}$)

-continued

Algorithm 4: Deep Learning Algorithm by Adam Using Secure Batch Mapping

38: $[V^{\wedge i}] \leftarrow \beta^{\wedge}_{2, t} [V^i]$     (accuracy: $2b_w + b_{\beta^{\wedge}\_2}$)
39: $[G^{\wedge i}] \leftarrow \text{Adam}([V^{\wedge i}])$     (accuracy: $b_{g^{\wedge}}$)
40: $[G^{\wedge i}] \leftarrow [G^{\wedge i}] \bigcirc [M^{\wedge i}]$     (accuracy: $b_{g^{\wedge}} + b_w + b_{\beta^{\wedge}\_1}$)
41: $[G^{\wedge i}] \leftarrow \text{rshift}([G^{\wedge i}], b_{g^{\wedge}} + b_{\beta^{\wedge}\_1})$     (accuracy: $b_w$)
42: $[W^i] \leftarrow [W^i] - [G^{\wedge i}]$     (accuracy: $b_w$)
43: end for Similar to the second embodiment, the deep learning can be performed by repeating the process other than the parameter initialization of the procedure 1 in Algorithm 4 until convergence or for a set number of learning times. The accuracy configuration and the positions to perform the right shift are devised in a similar manner as Modification Example 2 of the first embodiment.

(1) In the calculation of forward propagation, in a case where the accuracy $b_x$ of the feature X is not too large (for example, eight bits are sufficient in the case of pixel values of image data), the right shift is omitted because $b_w + b_x$ has room in the number of bits. (4) In the calculation of the parameter update, the division by the learning rate and the batch size is approximated by the arithmetic right shift by the H' bits, and the calculation is performed simultaneously with the arithmetic right shift for accuracy adjustment, thereby improving the efficiency.

Points of the Invention

In the present invention, processing of the optimization technique Adam is made efficiently with a single secure batch mapping by considering computations that the secure computing is not good at such as the square root and division included in the optimization technique Adam of the gradient descent method as one function. This allows learning with less times than conventional techniques that perform machine learning in the secure computing, and can reduce the overall processing time. Regardless of types of the machine learning model, this optimization technique can be applied to any model as long as it learns using a gradient descent method. For example, it can be used in various machine learning, such as neural network (deep learning), logistic regression, linear regression, and the like.

As such, according to the present invention, the optimization technique Adam of the gradient descent method is implemented in the secure computing, allowing the learning of a machine learning model with high prediction performance with a smaller number of learning times in the secure computing.

Although the embodiments of the present invention have been described above, a specific configuration is not limited to the embodiments, and appropriate changes in the design are, of course, included in the present invention within the scope of the present invention without departing from the gist of the present invention. The various kinds of processing described in the embodiments are not only executed in the described order in a time-series manner but may also be executed in parallel or separately as necessary or in accordance with a processing capability of the apparatus that performs the processing.

Program and Recording Medium

Figure 8:
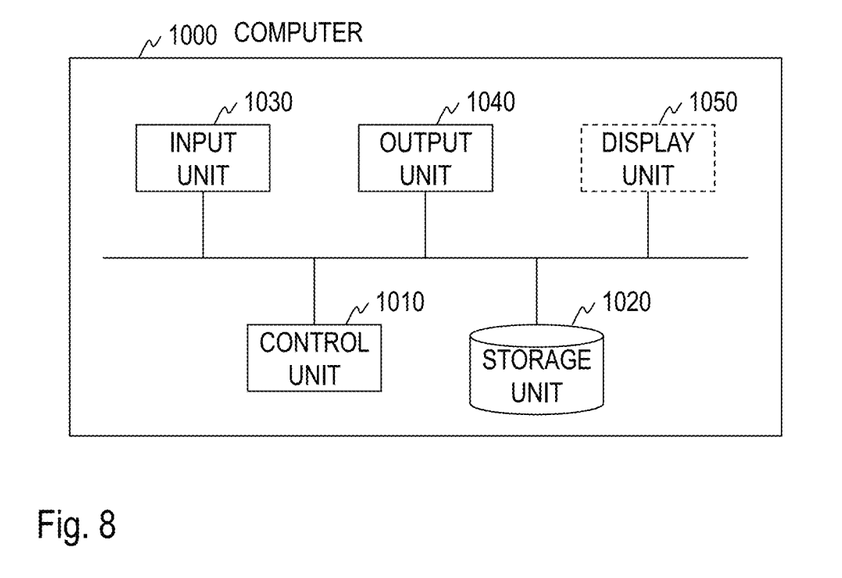
FIG. 8 is a diagram illustrating a functional configuration of a computer.

In a case in which various processing functions in each apparatus described in the foregoing embodiment are implemented by a computer, processing details of the functions that each apparatus should have are described by a program. By causing this program to be read into a storage unit 1020 of the computer illustrated in FIG. 8 and causing a control unit 1010, an input unit 1030, an output unit 1040, and the like to operate, various processing functions of each of the apparatuses described above are implemented on the computer.

The program in which the processing details are described can be recorded on a computer-readable recording medium. The computer-readable recording medium, for example, may be any type of medium such as a magnetic recording apparatus, an optical disc, a magneto-optical recording medium, or a semiconductor memory.

In addition, the program is distributed, for example, by selling, transferring, or lending a portable recording medium such as a DVD or a CD-ROM with the program recorded on it. Further, the program may be stored in a storage apparatus of a server computer and transmitted from the server computer to another computer via a network so that the program is distributed.

For example, a computer executing the program first temporarily stores the program recorded on the portable recording medium or the program transmitted from the server computer in its own storage apparatus. When executing the processing, the computer reads the program stored in its own storage apparatus and executes the processing in accordance with the read program. Further, as another execution mode of this program, the computer may directly read the program from the portable recording medium and execute processing in accordance with the program, or, further, may sequentially execute the processing in accordance with the received program each time the program is transferred from the server computer to the computer. In addition, another configuration to execute the processing through a so-called application service provider (ASP) service in which processing functions are implemented just by issuing an instruction to execute the program and obtaining results without transmitting the program from the server computer to the computer is possible. Further, the program in this mode is assumed to include information which is provided for processing of a computer and is equivalent to a program (data or the like that has characteristics of regulating processing of the computer rather than being a direct instruction to the computer).

In addition, although the apparatus is configured to execute a predetermined program on a computer in this mode, at least a part of the processing details may be implemented by hardware.

The invention claimed is:

1. A secure deep learning method performed by a secure deep learning system including a plurality of secure computation apparatuses connected via a network, each secure computation apparatus performing processing while coordinating with other secure computation apparatuses using a secret sharing, the secure deep learning method learning a deep neural network while at least a feature X of learning data, and true data T and a parameter W of the learning data are kept concealed, the secure deep learning method comprising:

receiving, by the plurality of secure computation apparatuses, input of data;

calculating, by a forward propagation calculation circuitry of each of the secure computation apparatuses, $[U^1] \leftarrow [W^0] \blacksquare [X]$;

calculating, by the forward propagation calculation circuitry, $[Y^1] \leftarrow$ Activation $([U^1])$;

calculating, by the forward propagation calculation circuitry, $[U^{i+1}] \leftarrow [W^i] \blacksquare [Y^i]$ for each i greater than or equal to 1 and less than or equal to n−1;

calculating, by the forward propagation calculation circuitry, $[Y^{i+1}] \leftarrow$ Activation $([U^{i+1}])$ for each i greater than or equal to 1 and less than or equal to n−1;

calculating, by the forward propagation calculation circuitry, $[U^{n+1}] \leftarrow [W^n] \blacksquare [Y^n]$;

calculating, by the forward propagation calculation circuitry, $[Y^{n+1}] \leftarrow$ Activation2 $([U^{n+1}])$;

calculating, by a back propagation calculation circuitry of each of the secure computation apparatuses, $[Z^{n+1}] \leftarrow$ Activation2' $([Y^{n+1}], [T])$;

calculating, by the back propagation calculation circuitry, $[Z^n] \leftarrow$ Activation' $([U^n]) \bigcirc ([Z^{n+1}] \blacksquare [W^n])$;

calculating, by the back propagation calculation circuitry, $[Z^{n-i}] \leftarrow$ Activation' $([U^{n-i}]) \bigcirc ([Z^{n-i+1}] \blacksquare [W^{n-i}])$ for each i greater than or equal to 1 and less than or equal to n−1;

calculating, by a gradient calculation circuitry of each of the secure computation apparatuses, $[G^0] \leftarrow [Z^1] \blacksquare [X]$;

calculating, by the gradient calculation circuitry, $[G^i] \leftarrow [Z^{i+1}] \blacksquare [Y^i]$ for each i greater than or equal to 1 and less than or equal to n−1;

calculating, by the gradient calculation circuitry, $[G^n] \leftarrow [Z^{n+1}] \blacksquare [Y^n]$;

calculating, by a parameter update circuitry of each of the secure computation apparatuses, $[G^0] \leftarrow$ rshift $([G^0], H')$;

calculating, by the parameter update circuitry, $[G^i] \leftarrow$ rshift $([G^i], H')$ for each i greater than or equal to 1 and less than or equal to n−1;

calculating, by the parameter update circuitry, $[G^n] \leftarrow$ rshift $([G^n], H')$;

learning, by the parameter update circuitry, a parameter $[W^i]$ between an i layer and an i+1 layer using a gradient $[G^i]$ between the i layer and the i+1 layer, for each i greater than or equal to 0 and less than or equal to n; and using the secure gradient descent computation method to predict an outcome based on the data, where $\beta_1$, $\beta_2$, $\eta$, and $\varepsilon$ are predetermined hyperparameters, $\blacksquare$ is a product of matrices, $\bigcirc$ is a product for each element, t is the number of learning times, [G] is a concealed value of a gradient G, [W] is a concealed value of the parameter W, [X] is a concealed value of the feature X of the learning data, [T] is a concealed value of a true label T of the learning data, [M], [M^], [V], [V^], [G^], [U], [Y], and [Z] are concealed values of matrices M, M^, V, V^, G^, U, Y, and Z having the same number of elements as the gradient G, and $\hat{\beta}_{1,t}$, $\hat{\beta}_{2,t}$, and $\hat{g}$ are given by following equations, Adam is a function that calculates a secure batch mapping to output the concealed value $[\hat{G}]$ of the matrix $\hat{G}$ of the value $\hat{g}$ with the concealed value $[\hat{V}]$ of the matrix $\hat{V}$ of a value $\hat{v}$ as an input, rshift is an arithmetic right shift, m is the number of pieces of learning data used for one learning, and H' is defined by a following equation, and n is the number of hidden layers of the deep neural network, Activation is an activation function of the hidden layers, Activation2 is an activation function of an output layer of the deep neural network, Activation2' is a loss function corresponding to the activation function Activation2, Activation' is a derivative of the activation function Activation.

2. The secure deep learning method according to claim 1, wherein $b_w$ is an accuracy of w, by is an accuracy of an element of Y, $b_\beta$ is an accuracy of $\beta_1$ and $\beta_2$, $b_{\hat{\beta}\_1}$ is an accuracy of $\hat{\beta}_{1,t}$, and $b_{\hat{g}}$ is an accuracy of $\hat{g}$, the forward propagation calculation circuitry calculates $[Y^{i+1}] \leftarrow$ Activation $([U^{i+1}])$ and then calculates $[Y^{i+1}] \leftarrow$ rshift $([Y^{i+1}], b_w)$, the back propagation calculation circuitry calculates $[Z^n] \leftarrow$ Activation' $([U^n]) \bigcirc ([Z^{n+1}] \blacksquare [W^n])$, and then calculates $[Z^n] \leftarrow$ rshift $([Z^n], b_y)$, each back propagation calculation circuitry calculates $[Z^{n-i}] \leftarrow$ Activation' $([U^{n-i}]) \bigcirc ([Z^{n-i+1}] \blacksquare [W^{n-i}])$, and then calculates $[Z^{n-i}] \leftarrow$ rshift $([Z^{n-i}], b_w)$, and the parameter update circuitry learns the parameter $[W^i]$ between the i layer and the i+1 layer using the gradient $[G^i]$ between the i layer and the i+1 layer, in accordance with the secure gradient descent computation method, for each i greater than or equal to 0 and less than or equal to n, wherein the secure gradient descent computation method comprises:

calculating, by the parameter update circuitry, $[M] \leftarrow \beta_1 [M]+(1-\beta_1)[G]$ and then calculates $[M] \leftarrow$ rshift $([M], b\beta)$, calculating, by the parameter update circuitry, $[V] \leftarrow \beta_2 [V]+(1-\beta_2)[G] \bigcirc [G]$ and then calculates $[V] \leftarrow$ rshift $([V], b\beta)$, and calculating, by the parameter update circuitry, $[\hat{G}] \leftarrow [\hat{G}] \bigcirc [\hat{M}]$ and then calculates $[\hat{G}] \leftarrow$ rshift $([\hat{G}], b\hat{g} + b\hat{\beta}\_1)$.

3. A secure deep learning system comprising a plurality of secure computation apparatuses connected via a network, each secure computation apparatus performing processing while coordinating with other secure computation apparatuses using a secret sharing, the secure deep learning system learning a deep neural network while at least a feature X of learning data, and true data T and a parameter W of the learning data are kept concealed, each of the secure computation apparatuses including:

a forward propagation calculation circuitry configured to calculate $[U^1] \leftarrow [W^0] \blacksquare [X]$, $[Y^1] \leftarrow$ Activation $([U^1])$, $[U^{i+1}] \leftarrow [W^i] \blacksquare [Y^i] [Y^{i+1}] \leftarrow$ Activation $([U^{i+1}])$ for each i greater than or equal to 1 and less than or equal to n−1, $[U^{n+1}] \leftarrow [W^n] \blacksquare [Y^n]$, and $[Y^{n+1}] \leftarrow$ Activation2 $([U^{n+1}])$;

a back propagation calculation circuitry configured to calculate $[Z^{n+1}] \leftarrow$ Activation2' $([Y^{n+1}], [T])$, $[Z^n] \leftarrow$ Activation' $([U^n]) \bigcirc ([Z^{n+1}] \blacksquare [W^n])$, and $[Z^{n-i}] \leftarrow$ Activation' $([U^{n-i}]) \bigcirc ([Z^{n-i+1}+] \blacksquare [W^{n-i}])$ for each i greater than or equal to 1 and less than or equal to n−1;

a gradient calculation circuitry configured to calculate $[G^0] \leftarrow [Z^1] \blacksquare [X]$, $[G^i] \leftarrow [Z^{i+1}] \blacksquare [Y^i]$ for each i greater than or equal to 1 and less than or equal to n−1, and $[G^n] \leftarrow [Z^{n+1}] [Y^n]$; and a parameter update circuitry configured to calculate $[G^0] \leftarrow$ rshift $([G^0], H')$, $[G^i] \leftarrow$ rshift $([G^i], H')$ for each i greater than or equal to 1 and less than or equal to n−1, and $[G''] \leftarrow \text{rshift}([G''], H')$, and learn a parameter $[W^i]$ between an i layer and an i+1 layer using a gradient $[G^i]$ between the i layer and the i+1 layer, equal to 0 and less than or equal to n, where $\beta_1$, $\beta_2$, $\eta$, and $\varepsilon$ are predetermined hyperparameters, ■ is a product of matrices, ○ is a product for each element, t is the number of learning times, [G] is a concealed value of a gradient G, [W] is a concealed value of the parameter W, [X] is a concealed value of the feature X of the learning data, [T] is a concealed value of a true label T of the learning data, [M], [M^], [V], [V^], [G^], [U], [Y], and [Z] are concealed values of matrices M, M^, V, V^, G^, U, Y, and Z having the same number of elements as the gradient G, and $\hat{\beta}_{1,t}$, $\hat{\beta}_{2,t}$, and $\hat{g}$ are given by following equations, Adam is a function that calculates a secure batch mapping to output the concealed value [G^] of the matrix G^ of the value $\hat{g}$ with the concealed value [V^] of the matrix V^ of a value $\hat{v}$ as an input, rshift is an arithmetic right shift, m is the number of pieces of learning data used for one learning, and H' is defined by a following equation, and n is the number of hidden layers of the deep neural network, Activation is an activation function of the hidden layers, Activation2 is an activation function of an output layer of the deep neural network, Activation2' is a loss function corresponding to the activation function Activation2, Activation' is a derivative of the activation function Activation, each of the secure computation apparatuses being configured to receive an input of data, and predict an outcome using the calculated gradient descent method based on the data.

* * * * *

UNITED STATES PATENT AND TRADEMARK OFFICE
CERTIFICATE OF CORRECTION

PATENT NO. : 12,401,494 B2  
APPLICATION NO. : 17/634237  
DATED : August 26, 2025  
INVENTOR(S) : Ibuki Mishina It is certified that error appears in the above-identified patent and that said Letters Patent is hereby corrected as shown below:

In the Specification

Column 3, Line 2, "■[X]," should be changed to --· [X]--

Column 3, Line 4, "[$W^i$]■[$Y^i$]" should be changed to --[$W^i$] · [$Y^i$]--

Column 3, Line 9, "[$W^n$]■[$Y^n$]" should be changed to --[$W^n$] · [$Y^n$]--

Column 3, Line 14, "([$Z^{n+1}$]■[$W^n$])," should be changed to --([$Z^{n+1}$] · [$W^n$]),--

Column 3, Line 16, "([$Z^{n-i+1}$]■[$W^{n-i}$])" should be changed to --([$Z^{n-i+1}$] · [$W^{n-i}$])--

Column 3, Line 19, "[$Z^1$]■[X]," should be changed to --[$Z^1$] · [X],--

Column 3, Line 20, "[$Z^{i+1}$]■[$Y^i$]," should be changed to --[$Z^{i+1}$] · [$Y^i$],--

Column 3, Line 22, "[$Z^{n+1}$]■[$Y^n$]," should be changed to --[$Z^{n+1}$] · [$Y^n$],--

Column 4, Line 14, "■b" should be changed to --· b--

Column 4, Line 15, "(■)," should be changed to --( · )--

Column 5, Line 4, "■$^t$" should be changed to --· $^t$--

Column 11, Line 7, "[$W^0$]■[X]," should be changed to --[$W^0$] · [X],--

Column 11, Line 8, "[$W^i$]■[$Y^i$]," should be changed to --[$W^i$] · [$Y^i$],--

Signed and Sealed this  
Sixth Day of January, 2026

John A. Squires  
*Director of the United States Patent and Trademark Office*

Column 11, Line 10, ""[$W^n$]■[$Y^n$]," should be changed to --"[$W^n$] · [$Y^n$],"--

Column 11, Line 21, "([$Z^{n+1}$]■[$W^n$])" should be changed to --([$Z^{n+1}$] · [$W^n$])--

Column 11, Line 22, "([$Z^{n-i+1}$]■[$W^{n-i}$])" should be changed to --([$Z^{n-i+1}$] · [$W^{n-i}$])--

Column 11, Line 34, "[$Z^1$]■[X], calculates [$G^i$] ← [$Z^{i+1}$]■[$Y^i$]" should be changed to --[$Z^1$] · [X], calculates [$G^i$] ←[$Z^{i+1}$] · [$Y^i$]--

Column 11, Line 36, "[$G^n$] ← [$Z^{n+1}$]■[$Y^n$]" should be changed to --[$G^n$] ← [$Z^{n+1}$] · [$Y^n$]--

Column 11, Line 65, "[$W^0$]■[X]" should be changed to --[$W^0$] · [X]--

Column 12, Line 6, "6: [$U^{i+1}$] ← [$W^i$]■[$Y^i$]" should be changed to --6: [$U^{i+1}$] ← [$W^i$] · [$Y^i$]--

Column 12, Line 8, "9: [$U^{n+1}$] ← [$W^n$]■[$Y^n$]" should be changed to --9: [$U^{n+1}$] ← [$W^n$] · [$Y^n$]--

Column 12, Line 12, "13: [$Z^n$] ← Activation' ([$U^n$]) ◯ ([$Z^{n+1}$]■[$W^n$])" should be changed to --13: [$Z^n$] ← Activation' ([$U^n$]) ◯ ([$Z^{n+1}$] · [$W^n$])--

Column 12, Line 13, "15: [$Z^{n-i}$] ← Activation' ([$U^{n-i}$]) ◯ ([$Z^{n-i+1}$]■[$W^{n-i}$])" should be changed to --15: [$Z^{n-i}$] ← Activation' ([$U^{n-i}$]) ◯ ([$Z^{n-i+1}$] · [$W^{n-i}$])--

Column 12, Line 16, "18: [$G^0$] ← [$Z^1$]■[X]" should be changed to --18: [$G^0$] ← [$Z^1$] · [X]--

Column 12, Line 17, "20: [$G^i$] ← [$Z^{i+1}$]■[$Y^i$]" should be changed to --20: [$G^i$] ← [$Z^{i+1}$] · [$Y^i$]--

Column 12, Line 19, "22: [$G^n$] ← [$Z^{n+1}$]■[$Y^n$]" should be changed to --22: [$G^n$] ← [$Z^{n+1}$] · [$Y^n$]--

Column 14, Line 38, "3: [$U^1$] ← [$W^0$]■[X]" should be changed to --3: [$U^1$] ← [$W^0$] · [X]--

Column 14, Line 41, "6: [$U^{i+1}$] ← [$W^i$]■[$Y^i$]" should be changed to --6: [$U^{i+1}$] ← [$W^i$] · [$Y^i$]--

Column 14, Line 45, "10: [$U^{n+1}$] ← [$W^n$]■[$Y^n$]" should be changed to --10: [$U^{n+1}$] ← [$W^n$] · [$Y^n$]--

Column 14, Line 49, "14: [$Z^n$] ← ReLU' ([$U^n$]) ◯ ([$Z^{n+1}$]■[$W^n$])" should be changed to --14: [$Z^n$] ← ReLU' ([$U^n$]) ◯ ([$Z^{n+1}$] · [$W^n$])--

Column 14, Line 52, "17: [$Z^{n-i}$] ← ReLU' ([$U^{n-i}$]) ◯ ([$Z^{n-i+1}$]■[$W^{n-i}$])" should be changed to --[$Z^{n-i}$] ← ReLU' ([$U^{n-i}$]) ◯ ([$Z^{n-i+1}$] · [$W^{n-i}$])--

Column 14, Line 56, "21: [$G^0$] ← [$Z^1$]■[X]" should be changed to --21: [$G^0$] ← [$Z^1$] · [X]--

CERTIFICATE OF CORRECTION (continued)
U.S. Pat. No. 12,401,494 B2

Column 14, Line 58, "23: $[G^i] \leftarrow [Z^{i+1}]\blacksquare[Y^i]$" should be changed to --23: $[G^i] \leftarrow [Z^{i+1}] \cdot [Y^i]$--

Column 14, Line 60, "25: $[G^n] \leftarrow [Z^{n+1}]\blacksquare[Y^n]$" should be changed to --25: $[G^n] \leftarrow [Z^{n+1}] \cdot [Y^n]$--

In the Claims

Column 17, Line 8, in Claim 1, "$[W^0]\blacksquare[X]$;" should be changed to --$[W^0] \cdot [X]$;--

Column 17, Line 12, in Claim 1, "$[W^i]\blacksquare[Y^i]$" should be changed to --$[W^i] \cdot [Y^i]$--

Column 17, Line 18, in Claim 1, "$[W^n]\blacksquare[Y^n]$" should be changed to --$[W^n] \cdot [Y^n]$--

Column 17, Line 25, in Claim 1, "$([Z^{n+1}]\blacksquare[W^n])$;" should be changed to --$([Z^{n+1}] \cdot [W^n])$;--

Column 17, Line 27, in Claim 1, "$([Z^{n-i+1}]\blacksquare[W^{n-i}])$" should be changed to --$([Z^{n-i+1}] \cdot [W^{n-i}])$--

Column 17, Line 32, in Claim 1, "$[Z^1]\blacksquare[X]$;" should be changed to --$[Z^1] \cdot [X]$;--

Column 17, Line 34, in Claim 1, "$[Z^{i+1}]\blacksquare[Y^i]$" should be changed to --$[Z^{i+1}] \cdot [Y^i]$--

Column 17, Line 37, in Claim 1, "$[Z^{n+1}]\blacksquare[Y^n]$" should be changed to --$[Z^{n+1}] \cdot [Y^n]$--

Column 17, Line 54, in Claim 1, "$\blacksquare$ is a product of matrices," should be changed to --$\cdot$ is a product of matrices,--

Column 18, Line 12, in Claim 2, "an accuracy of w, by" should be changed to --an accuracy of w, $b_y$--

Column 18, Line 17, in Claim 2, "$[Y^{i+1}] \leftarrow$ rshift ($[Y^{+1}]$, $b_w$)," should be changed to --$[Y^{i+1}] \leftarrow$ rshift ($[Y^{i+1}]$, $b_w$)--

Column 18, Line 19, in Claim 2, "$([Z^{n+1}]\blacksquare[W^n])$," should be changed to --$([Z^{n+1}] \cdot [W^n])$,--

Column 18, Line 22, in Claim 2, "$([Z^{n-i+1}]\blacksquare[W^{n-i}])$," should be changed to --$([Z^{n-i+1}] \cdot [W^{n-i}])$,--

Column 18, Line 51, in Claim 3, "$[W^0]\blacksquare[X]$," should be changed to --$[W^0] \cdot [X]$,--

Column 18, Line 52, in Claim 3, "$[W^i]\blacksquare[Y^i][Y^{i+1}]$" should be changed to --$[W^i] \cdot [Y^i][Y^{i+1}]$--

Column 18, Line 53, in Claim 3, "$[W^n]\blacksquare[Y^n]$," should be changed to --$[W^n] \cdot [Y^n]$,--

Column 18, Line 58, in Claim 3, "$([Z^{n+1}]\blacksquare[W^n])$," should be changed to --$([Z^{n+1}] \cdot [W^n])$,--

Column 18, Line 59, in Claim 3, "$[U^{n-i}])\bigcirc([Z^{n-i+1}+]\blacksquare[W^{n-i}])$" should be changed to --([U$^{n-i}$])◯([Z$^{n-i+1}$] · [W$^{n}$])--

Column 18, Line 63, in Claim 3, "[Z$^1$]■[X], [G$^i$] ← [Z$^{i+1}$]■[Y$^i$]" should be changed to --[Z$^1$] · [X], [G$^i$] ←[Z$^{i+1}$] · [Y$^i$]--

Column 18, Line 65, in Claim 3, "[G$^n$]←[Z$^{n+1}$][Y$^n$];" should be changed to --[G$^n$]←[Z$^{n+1}$] · [Y$^n$];--

Column 19, Line 5, in Claim 3, "layer, equal to" should be changed to --layer, for each i greater than or equal to--

Column 19, Line 7, in Claim 3, "■ is a product of matrices," should be changed to --· is a product of matrices,--